Aug. 2, 1966  J. R. ARTMAN  3,264,021
CONNECTING MEMBER FOR STRUCTURAL UNITS
Filed Nov. 26, 1963  5 Sheets-Sheet 1

INVENTOR.
JOHN R. ARTMAN
BY
Meyer, Baldwin, Doran & Young
ATTORNEYS Aug. 2, 1966 J. R. ARTMAN 3,264,021
CONNECTING MEMBER FOR STRUCTURAL UNITS
Filed Nov. 26, 1963
5 Sheets-Sheet 2

INVENTOR.
JOHN R. ARTMAN
BY
Meyer, Baldwin, Doran & Young
ATTORNEYS

Aug. 2, 1966 J. R. ARTMAN 3,264,021
CONNECTING MEMBER FOR STRUCTURAL UNITS
Filed Nov. 26, 1963 5 Sheets-Sheet 5

INVENTOR.
JOHN R. ARTMAN
BY
Meyer, Baldwin, Doran & Egan
ATTORNEYS.

United States Patent Office 3,264,021
Patented August 2, 1966

3,264,021
CONNECTING MEMBER FOR STRUCTURAL UNITS
John R. Artman, 142 Harmon Road, Aurora, Ohio
Filed Nov. 26, 1963, Ser. No. 326,274
26 Claims. (Cl. 287—189.36)

This application is a continuation-in-part of my copending application Serial No. 70,974, filed November 22, 1960, now abandoned, and entitled Connecting Member for Structural Units.

This invention relates to a modular connecting device adapted to complementarily interfit and connect with a like connecting device or devices in a plurality of different configurations which serve as joiners, jigs, or connectors for conventional structural members. The modular device as herein illustrated and described is particularly adapted for use in attaching or positioning rectangular tubing manufactured from metal or other material having the desired qualities of strength, rigidity, and the like which is suitable for buliding varying types of structures such as shelving, room dividers, scaffolding, furniture, racks, railing, or the like.

The invention is directed primarily to a device having five sides to which any materials may be joined when the device is used singly or for use in making connectors of various shapes having members extending therefrom in different directions to which other conventional structural elements may be attached. The invention specifically contemplates a device for constructing connectors having rectangular, outwardly projecting members adapted to telescopically receive and interfit rectangular or square tubular structural elements to maintain the same in position during welding or other processing or to permanently connect them as part of an overall construction.

It is also anticipated that the modular connecting device of this invention is adapted for use as a building toy wherein, for example, it may be supplied as a plurality of packaged, like modular members manufactured of light metal, semi-resilient plastic, or similar material for assembling by children into various toy structures.

An important object of this invention is to provide a modular connecting device formed from sheet metal or the like which is substantially cubiform in shape and adapted to be interconnected with a like modular device or devices in a plurality of different ways.

Another object of this invention is to provide such a modular device which can be assembled with other like modular devices into a plurality of shapes without the use of additional attachment means or special tools if so desired.

A further object is to provide a modular device having the above characteristics which can be assembled with like modular devices to provide attachment means for conventional structural members in as many as six different directions in three right angularly disposed dimensions.

Still another object of this invention is to provide a modular device of the above type which, when assembled with like modular devices, may be secured rigidly thereto by simple, conventional fastening means.

A still further object of this invention is to provide a modular device of the above type which when used singly and attached to a surface will afford an opportunity to join materials to an additional four sides of the device.

Another object is to provide a device of the above type adapted for use alone or with a like device for connecting two right angularly disposed structural members where relative movement between said members is limited by the surroundings.

Yet another object is to provide such a device having, in association therewith, novel connector means for securing the modular members in their interlocking engagement with each other.

In general, the object of this invention is to provide a modular connecting device which is simple and economic to manufacture, highly durable in use, and adapted for quickly and easily connecting, joining, spacing or using as a jig to form a wide variety of shapes useful in building various structures.

Other objects of this invention and the invention itself will be readily understood from the following specification and the accompanying drawings, in which said drawings.

Figure 1:
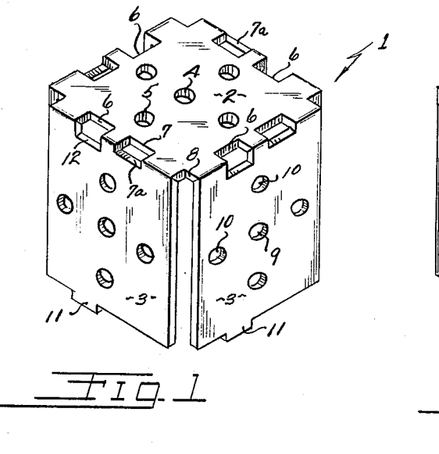
FIG. 1 is a perspective view of a first form of the modular connecting device of this invention showing said device in inverted position.
Figure 2:
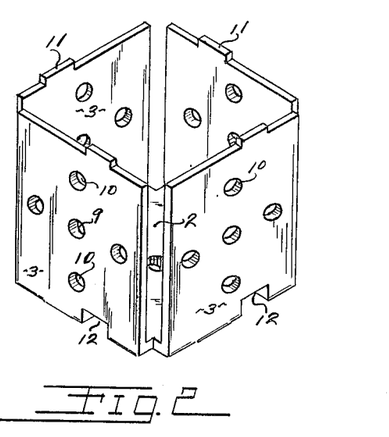
FIG. 2 is a perspective view of the modular device of FIG. 1 shown in upright position.

Referring now to the drawings and particularly to FIGS. 1 and 2, the modular connecting device of this invention comprises a generally cubiform member 1 having a bottom wall 2 and four right angularly disposed side walls 3 each of which is connected along its bottom edge to one edge of said bottom wall. The member 1 may be formed from a single piece of sheet steel or other suitable formable material, or said modular member may be cast. As shown in FIG. 2, all of the side walls 3 are separate from each other and are disposed upwardly at right angles to the bottom wall 2. The upper side of the cubiform member 1 is open whereby a plurality of said members may be connected together in a manner to be herein later fully described.

The bottom wall 2 is generally square in shape and is provided with a plurality of apertures, a central aperture 4 and a plurality of radially spaced apertures 5 disposed concentrically around said central aperture. Each edge of the bottom wall 2 is provided with a pair of spaced, rectangular slots 6 and 7 which are disposed immediately adjacent the side walls 3. The corners of said bottom wall are provided with right angular, V-shaped notches 8 the sides of which are coplanar with the side edges of adjacent side walls 3.

Each side wall 3 is apertured in a manner similar to that of the bottom wall 2 having a central aperture 9 and a plurality of radially outwardly spaced, concentrically positioned apertures 10 disposed around said central aperture. The upper edge of each side wall 3 is provided with an upwardly extending tongue 11 which is disposed above and in vertical alignment with the slot 6 in the edge of the bottom wall 2 to which said side wall is connected. The lower edge of each side wall 3 has a rectangular slot 12 therein which is aligned with the corresponding slot 6 of the bottom wall. As best seen in FIG. 1, the slots 6 and 12 open into each other to form an angular opening at the line of juncture between the bottom wall 2 and each side wall 3. It will be noted that each slot 6 has the same relative position at each edge of the bottom wall 2 and that the tongues 11 are correspondingly positioned relative to the upper edges of the side walls 3.

The slots 7 are shown as they would appear if the modular member 1 were manufactured from a single piece of flat sheet metal or the like. Under those circumstances, the member 1 would first be cut or stamped in the form of a cross while the sheet metal was in a flat condition. All of the apertures and slots would be punched out at this time with the slots 7 being positioned with the outer edge of each slot exactly on the proposed folding line between the bottom wall 2 and the side walls 3. Subsequent folding of said side walls into their normal, right angularly disposed positions as shown in the drawings would cause stretching of the metal at the outside of the fold line and in the area parallel with one side of each slot 7. As a result of the above, one side of each slot 7, as indicated at 7a in FIG. 1, would be disposed at right angles to the opposite side since in folding the metal the outside of the slots would tend to move with the corresponding side wall 3.

It will be readily seen that if the slots 7 are punched or formed after the side walls 3 have assumed the position as shown in the drawings, the longer sides of said slots would be parallel and there would be no apparent notching of the side wall bottom edges. Either method of forming the slots 7 is satisfactory for the purpose of this invention, it being only necessary that the slots 6 have corresponding slots 12 which extend slightly into the bottom edges of the side walls 3.

The distance from the upper edges of the tongues 11 to the bottom surface of the bottom wall 2 is the same as the dimension from the outer surface of any side wall 3 to the outer surface of the side wall directly opposite therefrom. The maximum outer dimensions of each modular member 1 are such, therefore, as to define a cube. The tongues 11 extend upwardly from the upper edges of the side walls 3 a distance substantially equal to the thickness of the particular metal from which the member is manufactured. For example, if the modular member defines a cube having a dimension of substantially 1 inch in all three dimensions, a suitable material from which to manufacture said member would be 16 gauge steel, and the tongues 11 of such a modular member would be substantially .0613″ in length. The above is given by way of example only, and it will be understood that the modular member may be made to define any size cube and that as the size varies the metal thickness would also vary depending upon the circumstances under which the member would be used. Heavier metals would obviously provide stronger structures where strength is an important factor, and lighter gauge metals would effect a saving in weight wherever lightness of weight is an essential factor.

The modular members of this invention can be interconnected in two basic ways from which a wide variety of connector shapes may be derived. A first method of assembly comprises disposing a pair of the members in inverted relation to each other, such as is illustrated in FIGS. 1 and 2, and then overlapping one side wall 3 from each member whereby the inside surfaces of said side walls engage in flatwise contact with each other. The tongue 11 of each side wall is inserted in the slot 6 at the base of the relatively overlapping side wall whereby the upper edge of each said tongue is flush with the lower surface of the bottom wall 2 of the other modular member. This is well illustrated in FIG. 4 in which three modular members have been connected together in the above manner with two of said members interlocked with two oppositely facing side walls 3 of a centrally disposed member.

Figure 4:
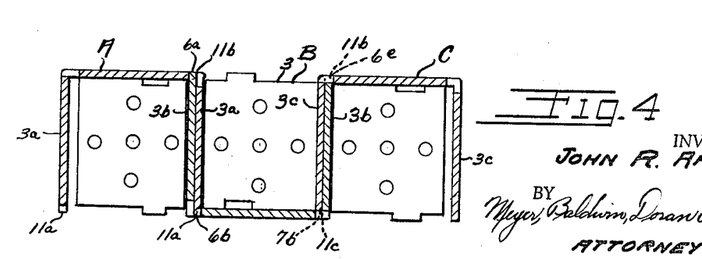
FIG. 4 is a section taken along the line 4—4 of FIG. 3.

For the purpose of clarification, the identical modular devices or members 1 as shown in FIG. 4 have been designated A, B, and C, and the identical parts of each device have been given their original numerals plus a subdesignation a, b, c, etc. to indicate the particular modular member that each part is integral with. This method of designating identical parts of different modular members is used consistently in other figures of the drawings and in no way indicates that there is any difference in the form and function of said parts but only clarifies their positions relative to like parts of a different modular member.

The member B is disposed between the members A and C in an upright position such as that shown in FIG. 2. Members A and C are in the inverted position of FIG. 1 whereby a side wall 3c overlaps a side wall 3b of the members C and B, respectively. In the same manner, the side wall 3a of the member A overlaps an opposite side wall 3b of the member B. In this position, a tongue 11b of the member B is disposed within a slot 6a of the member A, and in like manner, a tongue 11a of the member A is disposed within a slot 6b of the member B. It will be readily seen that tongues 11c and 11b are similarly disposed within the slots 6b and 6c, respectively. The tongues 11 and the slots 6 are of such relative sizes that the tongues fit closely and are frictionally retained within the slots but not so tightly as to prevent assembly of the modular members with ordinary manual pressure.

Figure 3:
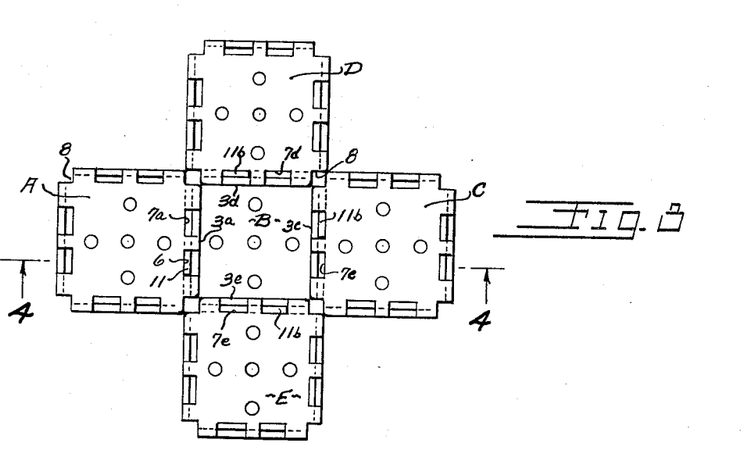
FIG. 3 is a plan view, on a reduced scale, of five modular devices connected in the form of a cross.

As shown in FIG. 3, as many as four like modular members can be assembled around the centrally disposed modular member B with each of the said four members being attached to a separate wall of the central member. As illustrated, the member B is in an upright position and is seen from above looking down upon said member. The members A and C are attached at the left and right hand walls of the member B respectively as hereinbefore described. Additional modular members D and E are attached to the other two walls of the member C with side walls 3d and 3e overlapping and attached to said remaining two side walls of the member B. The members A, C, D and E are, of course, in the inverted position relative to the central member B. The notches 8 in each modular member are so formed as to allow adequate clearance at the corners between adjacent members surrounding the central member B. To accomplish this end, the notches 8 are generally formed whereby each side of the notch is substantially equal to two wall thicknesses of the material from which the modular members are made. The resulting configuration of all of the members A, B, C, D, and E assembled together is that of a symmetrical cross having four radiating extensions with each extension being disposed at right angles to an adjacent extension.

Figure 8:
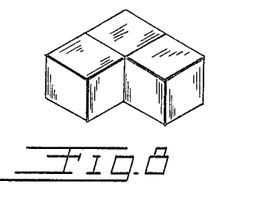
Figure 9:
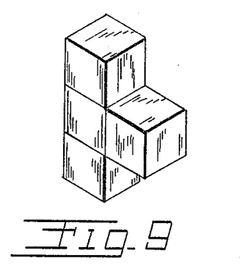

It will be readily understood that the configurations as shown schematically in FIGS. 8 and 9 can be formed by using the first basic connecting method as above described. For example, an elbow or L-shape connector such as that shown in FIG. 8 can be made by assembling the members B, C, and E as shown in FIG. 3 thereby eliminating the use of the members A and D. If the configuration of FIG. 9 is desired, such configuration can be attained by assembling the members A, B, C and E and eliminating the member D. The result is a T-shape connector to which rectangular tubing or other structural members can be attached from three directions.

Figure 5:
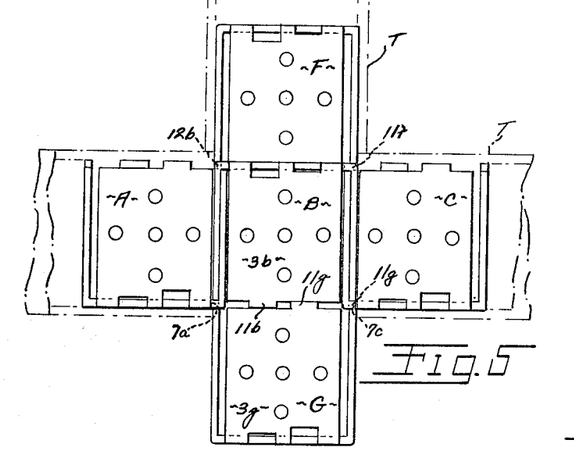
FIG. 5 is a side elevation of five modular devices connected in the form of a cross.

FIG. 5 shows a cross similar to FIG. 3 wherein it is assumed that the cross is formed in a plane at right angles to that of FIG. 3 but wherein the first basic attachment method is still used for positioning members on either lateral side of a central modular member. In FIG. 5, the central member is again designated as B and the left and right hand members are designated A and C respectively as before. However, in FIG. 5, all of the members A, B, and C, although maintaining their positions relative to each other as shown in FIG. 4, have been inverted whereby the member B opens downwardly whereas the members A and C open upwardly.

In assembling the connector formation of FIG. 5, the second basic method of interconnecting two of the modular members 1 is utilized. Referring again to FIGS. 1 and 2, when two modular members are held in the same position with both members being either upright or inverted, it will be readily seen that the tongues 11 of one of the members are positioned in such manner that they can be inserted into the slots 12 of the other member. The slots 12 and the tongues 11 are coplanar with the respective side walls associated therewith whereby the tongues are positioned outside of the slots 6 and in line with the slots 12. The slots 12 are preferably deep enough that the tongues 11 do not bottom within said slots thereby allowing the upper edges of the side walls 3 of the superposed member to rest upon the bottom surface of the bottom wall of the other member. This second method of attaching two modular members is well shown in FIGS. 5 and 12 wherein a modular member designated with the letter F has been positioned upon the central member B with the open side of the member F connected to the closed side of the member B. Tongues 11f are thereby inserted in the slots 12b of the members F and B respectively. This in no way interferes with the attachment of member A or C to the central member B since the slots 6 of each modular member are disposed inside the slots 12 whereby a tongue of the member A has room to pass and overlap a downwardly projecting tongue of the member F. The adjacent tongues of the members F and C also overlap in the same manner.

When two modular members are attached in the manner of members F and B, lateral movement of either member is prevented by the tongues 11f interacting with the slots 12b. Each pair of oppositely positioned slots and tongues prevents movement of either member relative to the other in one horizontal direction thereby making it impossible to detach the members from each other by any means other than pulling them vertically apart.

Figure 7:
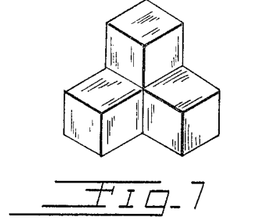
FIGS. 7, 8, 9, and 10 are schematic showings on a yet smaller scale of different shapes which can be made by variously assembling a plurality of modular devices.

From the foregoing it will be seen that a corner connector such as that shown in FIG. 7 can be assembled by utilizing the two basic methods of attaching pairs of the modular members 1. An L-shaped member is first formed (FIG. 8) such as by assembling the members B, C, and E in the manner in which they are shown in FIG. 3 with the assembly inverted whereby the bottom wall 2 of the member B is facing upwardly. A fourth member is then seated upon the bottom of the member B in the manner in which the member F is positioned in FIG. 5. The result is a corner connector to which conventional structural members can be readily attached.

Referring again to FIG. 3, it will be noted that when the members A and C are attached to opposite side walls of the central member B, the overlapping of the side walls of the respective members causes the slots 7 of the bottom walls 2 of the members A and C to be positioned in line with the side walls 3b as indicated at 7a and 7c. The slots 7a and 7c are thereby positioned to receive the tongues 11 of yet another modular member which may be positioned with opposite of its side walls resting respectively upon the bottom walls of the members A and C. This is illustrated in FIG. 5 where the member G has been positioned immediately below the member B with the open side of G facing the open side of the member B. This brings the tongues of G, designated 11g, into the slots 7a and 7c. If the additional members D and E (FIG. 3) are attached to the central member B, the remaining two tongues 11g of the member G will interfit the slots 7d and 7e of the members D and E, respectively. The result is a connected member such as that shown in FIG. 10 whereby structural members may be joined in three right angularly disposed dimensions in all six possible directions.

When attaching a modular member in the manner as shown in connection with member G of FIG. 5, it is preferred that at least two other modular members be attached to the central member B either in the manner of members A and C of FIG. 5 or in an alternative manner such as shown at C and E of FIG. 3. Thus, at least two of the tongues 11g of member G are disposed within slots 7 of other modular members, and this insures that the member G will be maintained firmly in line with the member B whereby those tongues 11 which are not engaged in any slot will rest against and be in alignment with the upper edges of the side walls of the opposing member. As indicated in FIG. 5, tongue 11g abuts the upper edge of the side wall 3b of the member B and at the same time a corresponding tongue 11b abuts the upper edge of a side wall 3g of the member G.

Figures 6, 11, 12:
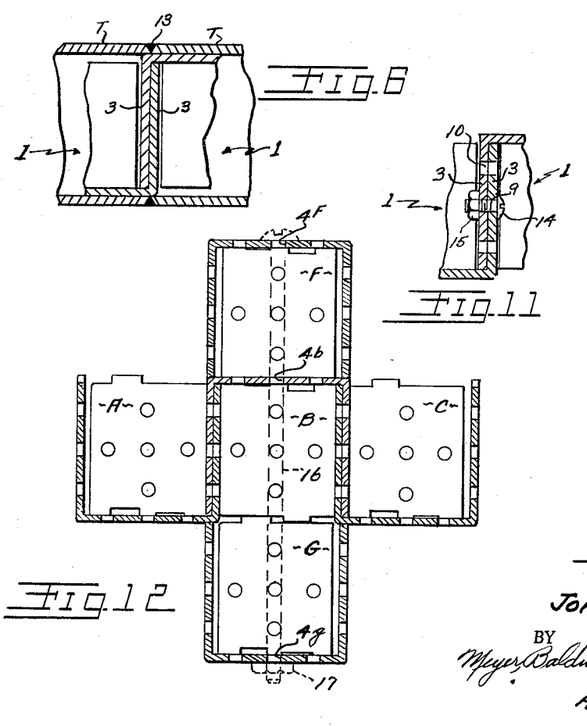
FIG. 6 is a fragmentary section of two interconnected modular devices supporting a pair of aligned, rectangular tube sections.
FIG. 11 is a fragmentary section, in the scale of FIGS. 3–6, of two interconnected modular devices secured together by a conventional nut and bolt.
FIG. 12 is a section of five modular devices connected together in the same manner as that shown in FIG. 5.

The frictional interfit between the tongues and slots of assembled modular members maintains them in any configuration in which they are assembled, and under certain circumstances such interfit will be sufficiently strong in itself for the purpose intended. For example, when assembling rectangular tubular structural members at points of juncture said members are commonly welded to each other to effect a strong unitary structure. The device of this invention is useful under these circumstances as a jig providing means for holding the joined tubing in place while it is being welded or otherwise suitably secured. The tubing is telescoped over a projecting modular member which is preferably of such size as to slidably but closely interfit the particular tubing employed. This is illustrated in FIGS. 5 and 6 where the tubing T is positioned upon extending modular members and brought into contact with end edge surfaces of another section of tubing whereby the two may be joined by a weld as indicated at 13 (FIG. 6). Because each modular member is a cube as measured at its greatest dimensions, a square tube of corresponding size can be connected thereto regardless of the position of any extending modular member.

The illustration of FIG. 6 shows two tube sections T connected in alignment by a pair of modular devices 1 which have been attached to each other according to the first method set forth whereby their side walls 3 overlap. The tube sections T are brought together at a point aligned with the continuous inner surfaces of the overlapping wall 3 to be held in alignment during the welding operation. It will be noted that in this instance the sections of tubing T prevent any disengagement between the attached modular members whereby they cannot come apart without removing the sections of tubing. Each overlapping side wall 3 is actually disposed within the opposite section of tubing thereby preventing any possible vertical movement between the modular members such as would cause them to disengage.

The modular device of this invention is additionally so adapted that the individual modular members can be rigidly and tightly secured together by means of simple fastener devices. Because of the uniform and concentric location of the patterns of apertures in the walls, said apertures line up with the apertures of other modular members in such manner that the connector configurations as hereinbefore described can be bolted together if so desired. FIG. 11 illustrates the manner in which the central apertures 9 of two contiguous and interlocked side walls of a pair of modular members are aligned whereby a bolt 14 may be projected therethrough and secured with a nut 15. At the same time the surrounding apertures 10 of each side wall are also aligned and additional bolts or other fastening means may be projected therethrough if so desired. The fact that each modular member 1 has one completely open side makes the apertures in the side walls readily accessible for inserting the bolt 14 or for grasping and tightening the nut 15. If the bolt 14 has a slotted head as shown in FIG. 11, a small conventional screwdriver may be applied thereto by inserting said screwdriver through the central aperture 9 in the side wall which is opposite that wall being bolted. In this manner, a cross such as that illustrated in FIG. 3 or any connector configuration derived therefrom can be quickly and easily bolted together when the modular device is used for more permanent supporting purposes.

Figure 10:
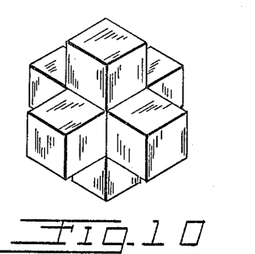

FIG. 12 illustrates the manner in which a single bolt may be used to secure a cross shape connector permanently together or a connector made in the form of the schematic showing of FIG. 10. Under these conditions, an elongated bolt shown in dotted line at 16 is projected downwardly through the central aperture 4f of the member F, the aligned central aperture 4b in the bottom wall of the member B, and through the central aperture 4g in the bottom wall of the member G. The bolt 16 projects outwardly below the bottom wall of the member G and is at that point secured by a conventional nut 17. The laterally projecting, attached modular members A and C are prevented from disengaging from the central member B due to the fact that the member G abuts the bottom surfaces of said members A and C and prevents any downward movement thereof relative to the central member B. The members D and E (FIG. 3), if also attached to the central member B, are likewise securely held in place by the bottom member G. Thus either a cross or a six directional figure of great strength can be held together by a single bolt and nut or equivalent fastening means.

It will be obvious from the above description that if the member F of FIG. 12 is not needed, it or any one or more of the laterally projecting members may be dispensed with under which conditions a single bolt projected through the apertures 4b and 4g would be effective to secure the resultant connectors configuration together.

The connectors formed as above set forth are also useful for attaching elongated structural members of other than square section. Flat metal struts are readily attachable to the modular members by bolting through the apertures provided, welding, or any other suitable means. Struts which are L-shaped, I-shaped, T-shaped, or U-shaped in section are equally adaptable for fastening to the modular members by any well known means. The modular devices may also be mounted singly or in combination with like members, to any supporting surface such as a wall, ceiling, floor, or other fixed structural surface thereby affording attaching means in various forms for receiving struts, braces, supports, panels, or the like.

When manufacturing this device for use as building toys for children, the modulator members may be made from any one of a number of commercially available plastics which are readily moldable into any desired shape. It will be readily understood that by connecting a large number of the devices together in the ways suggested above, an endless variety of toy buildings, bridges, towers, walls and the like can be constructed. For example, a wall of any desired size may be built by attaching additional modular members to a configuration as shown in FIG. 3. The members A, C, D, and E may be treated as center members with the side walls having other modular members attached thereto in the same manner in which they are attached to the member B. Whether used as a toy or for more serious building purposes, the basic methods of attaching and assembling the members is exactly the same.

Figures 13, 14:
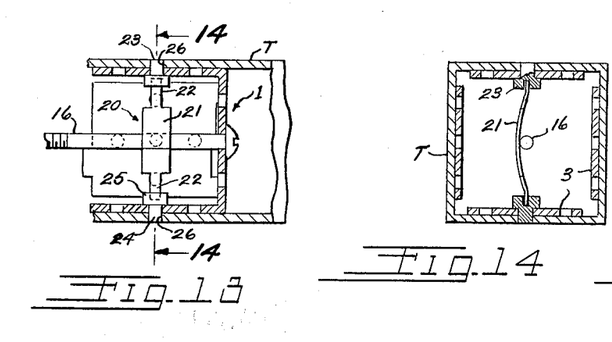
FIG. 13 is a section of one modular device supporting a tube and connected thereto by novel connector means.
FIG. 14 is a section taken along the line 14—14 of FIG. 13.

FIGS. 13 and 14 illustrate the use of a modular member of this invention in association with a novel fastener adapted to be used therewith. The fastener is shown at 20 and comprises, in the form of FIGS. 13 and 14, a curved, leaf spring body portion 21 having reduced, longitudinally projecting end portions 22. Each end portion 22 has a latch member 23 secured thereto which comprises a small shaft 24 at its outwardly projecting end and a flange 25 at its inner end. The shaft 24 is adapted to slidably interfit any of the apertures in the modular member, and the flange 25 is larger than said apertures thereby limiting the extent to which the shaft can penetrate. The distance between the latch members 23 is normally substantially greater than the distance between a pair of opposed side walls of a modular member whereby when the shafts 24 are projected through apertures in said opposed walls, they are constantly urged outwardly by the stressed body portion 21 which holds the flanges 25 resiliently against the inner surfaces of the opposed walls. The shafts 24 are of such length as to project outwardly beyond the outer surfaces of the opposed side walls 3 and there interfit with apertures 26 in a section of tubing T telescoped over the modular member 1. In this way the tube T is securely locked to the modular member, and for certain types of installation would make welding or other means of fastening unnecessary.

As best shown in FIG. 14, it will be noted that the tensioned body portion 21 is bowed laterally whereby it passes around any bolt 16 which may be projected through the modular member 1. It will also be noted that a tube connected in this manner to the modular member is readily detachable by pushing the shafts 24 inwardly and sliding the tube T off of the modular device.

Figure 15:
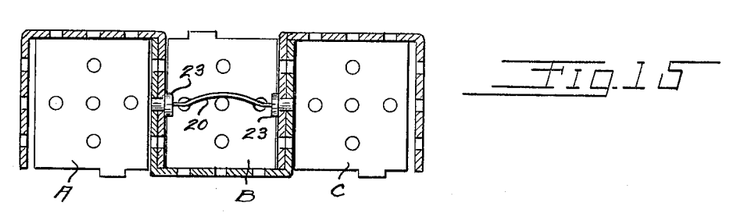
FIG. 15 is a view similar to FIG. 4 showing three modular devices secured together by the connector means of FIGS. 13 and 14.

FIG. 15 shows the manner in which a fastener 20 may be used to secure two or three attached modular members in such manner as to prevent their disengagement from each other. In this instance, three modular members 1 are attached together with overlapping side walls in the manner as illustrated in FIG. 4. This brings side wall apertures of all three modular members into alignment, and a fastener 20 may be positioned with the centrally disposed modular member whereby the shafts 24 of the latch members 23 project through the aligned apertures 9 in the overlapping, contiguous side walls 3. This firmly locks the three members together since disengagement between any two members so attached together depends upon the ability for one of them to move laterally relative to the other. The fastener 20 would be equally effective if only two modular members were fastened together in this manner since one of the shafts 24 would project through the aligned apertures 9 in the overlapping side walls 3 whereas the other shaft 24 would simply be seated in the central aperture of the opposed side wall.

Other possible ways of using the fastener 20 in conjunction with the modular devices and conventional tube sections will be readily apparent from the above illustrated examples.

Figure 16:
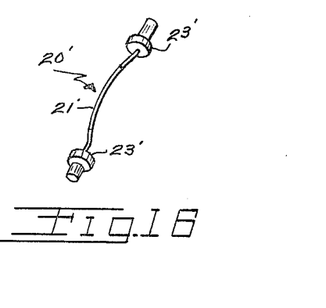
FIG. 16 is a perspective view of a modified form of the connector means of FIG. 13.

FIG. 16 shows a modified form of the fastener 20 as indicated at 20'. The fastener 20' has latch members 23' at the ends thereof which are identical with the latch members 23 of the fastener 20. The difference between the fastener 20 and the fastener 20' is in the body portion shown at 21' which consists of a length of bowed, spring steel wire which serves as means for biasing the latch members 23 in opposite directions to operate in the manner of and for the same purpose as the fastener 20.

Figure 17:
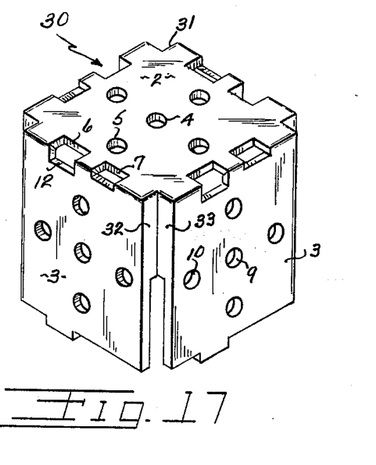
FIG. 17 is a perspective view similar to FIG. 1 of a second form of the modular device.
Figure 18:
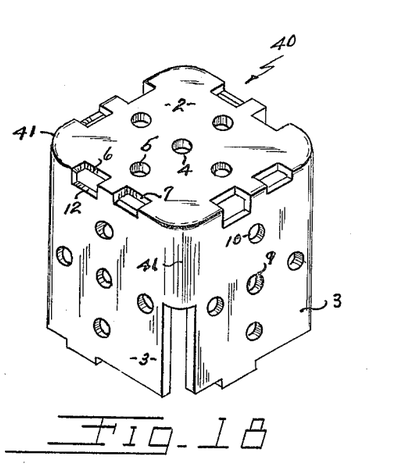
FIG. 18 is a view similar to FIGS. 1 and 16 showing a third form of the modular device.

FIGS. 17 and 18 respectively show other forms of the modular member 1 as indicated generally at 30 and 40. These two forms of the modular device of this invention are identical in all respects in form, dimension, and function with that of the first form with the exception that portions of adjacent side walls have been connected to add strength and solidity to the device. Therefore, the same numerals as used in the first form of the invention are used throughout these second two forms in all respects except the modified corners. Each modular member as shown in FIGS. 17 and 18 has a bottom wall 2 and side walls 3 with the bottom wall being apertured at 4 and 5 and the side walls being similarly apertured at 9 and 10 in the same manner as the first form of the invention. Slots are provided at 6, 7, and 12 in the same position and for the same purpose as identically numbered slots in FIGS. 1 and 2.

In the modular member generally indicated at 30 in FIG. 17, adjacent side walls 3 are joined by a V-shaped, inverted corner 31 having converging wall portions 32 and 33 which are connected to the lateral edges of adjacent side walls and extend from the bottom wall 2 to a point half or less of the vertical height of said side walls. A modular device may be formed in this manner either by deep drawing or by casting, and the connection between portions of adjacent edges of the side wall creates a structure of extreme strength for structures of the type where strength is a critical factor. By allowing the side walls 3 to remain separated at least or slightly more than half of their entire length, modular members according to the form as shown at 30 may be assembled and used in all respects in the same manner as the device of FIGS. 1 and 2.

In the modular member 40 of FIG. 18, the connected portion of adjacent side walls 3 as indicated at 41 is convexly outwardly rounded about an axis disposed within the member and has a radius sufficiently large to insure that when five such members are assembled in the form of a cross as shown in FIG. 3, said corners do not interfere with the corners of a like member attached to an adjacent wall of a center member. The connecting portion 41 also extends from the bottom wall 2 half or less of the vertical dimension of the side walls 3 whereby overlappingly attached like members may be assembled as in the first form of the invention. The modular member 40 may be formed in the same manner as the modular member 30 and also provides a structure of extreme strength.

Figure 19:
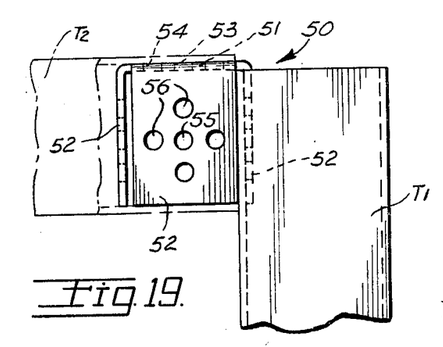
FIG. 19 is an elevation of a fourth form of the modular device shown attached to one end of an upright, tubular member.
Figure 20:
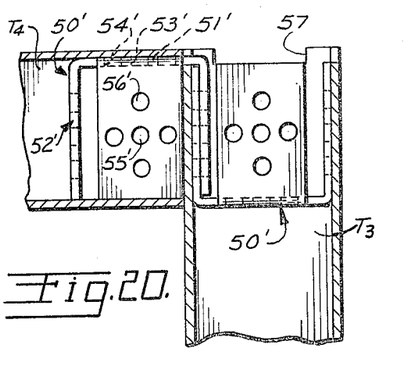
FIG. 20 is a view similar to FIG. 19 showing the same kind of attachment using two modular devices.

The form of the invention shown in FIGS. 19 and 20 is similar to the form shown in FIGS. 1 and 2 and comprises a cubiform member 50 having a bottom wall 51 and side walls 52 formed integrally with said bottom wall and disconnected at their edges from each other. The bottom wall 51 has a central aperture 53 and four radially spaced apertures 54, each side wall 52 similarly having a central aperture 55 and radially spaced apertures 56 disposed therearound. The form of the invention shown in FIG. 19 differs from that shown in FIGS. 1 and 2 in that the distal edges of the side walls 52 are not provided with tongues of the type shown at 11 in the first form of the invention.

As shown in FIG. 19, each side wall 52 is spaced outwardly from the vertical edges of adjacent side walls substantially the thickness of the metal from which a typical tubular member with which the modular member 50 may be used is made. A tubular member of the type referred to is shown at T1 and is disposed in a vertically upright position with one of the side walls 52 overlappingly engaging a flat wall portion of said tubular member. A second tubular member, shown in broken line at T2, is disposed horizontally at right angles to the tubular member T1 and is telescoped over the modular member 50. The tubular members T1 and T2 and the modular member 50 thus provide a corner structure useful in constructing shelving, room dividers, scaffolding, furniture, racks, railing, or the like. The modular member 50 may be used in this manner to hold the two right angularly disposed tubular sections in position for welding the same or said modular member may be used to rigidly connect said two tubular sections together by the simple expedient of bolting through any of the available apertures 53–56 or by the use of a fastener of the type shown in FIG. 13 or FIG. 16.

The modular members illustrated in FIG. 20 are substantially similar to the form shown in FIG. 19, the difference being that in FIG. 20 the side walls are spaced outwardly beyond the vertical edges of adjacent side walls a greater distance than the thickness of the material from which the tubular members are made whereby to also accommodate the thickness of a like modular member. The modular members in FIG. 20 are designated 50' and each comprises a bottom wall 51' and four side walls 52'. The bottom wall is centrally apertured at 53' and has radially disposed apertures 54' while each side wall 52' has a central aperture 55' and radially disposed apertures 56'.

The corner structure of FIG. 20 comprises two modular members 50', a vertically upright tubular structural member T3, and a horizontally disposed tubular structural member T4. The upper edges of the tubular member T3 are notched at 57 to a depth which is substantially equal to the metal thickness of a modular member plus the metal thickness of a tubular member and to a width sufficient to admit one of the side walls 52' between its side edges. A first modular member 50' is positioned within the tubular member T3 with the distal edges of its side walls 52' disposed at the level of the bottoms of the notches 57. A second modular member 50' is then inverted and disposed with one of the side walls 52' overlapping one upper wall portion of the tubular member T3 and one of the upwardly projecting side walls 52' of the first modular member 50'. As well shown in FIG. 20, the second or inverted modular member 50' is then disposed with its bottom wall 51' one metal thickness below the upper edges of the tubular member T3 whereby when the tubular member T4 is telescoped thereon, the upper surface of said tubular member T4 is coplanar with the upper edges of the tubular member T3. Since the downwardly overlapping side wall 52' of the inverted modular member is seated in one of the notches 57, said modular member and the tubular member T4 which it carries are effectively held against lateral movement relative to the tubular member T3. As in the form of FIG. 19, the modular members 50' may be rigidly secured in place by any suitable means such as bolts or fasteners disposed through any of the available apertures 53'–56'.

Figure 21:
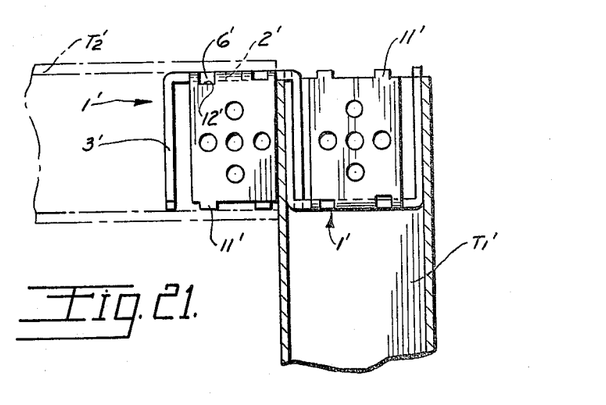
FIG. 21 is a view similar to FIG. 20 showing a like use of two modular devices of the form shown in FIGS. 1 and 2.

FIG. 21 shows a use of the embodiment of FIGS. 1 and 2 similar to that shown in FIG. 20. In FIG. 21, the modular members have been modified slightly in the manner of the modular members 50' by spacing the side walls outwardly from edges of adjacent side walls a greater than normal distance. The modular members are indicated at 1', each having a bottom wall 2', side walls 3', and tongues and slots 11' and 6', 12' of the type described in detail in connection with the first form of the invention.

The corner structure of FIG. 21 is made by placing one of the modular members 1' within the upper open end of a tubular member T1' which is substantially similar to the tubular member T1 of FIG. 19. The first modular member 1' is inserted to a depth whereby only the tongues 11' of said member project upwardly above the upper edges of the tubular member T1'. A second modular member 1' is inverted with one side wall 3' thereof overlappingly engaging one side wall of the tubular member T1' and one side wall 3' of the first mentioned modular member 1'. With the tongues and slots of the modular members engaging each other in the manner described in connection with the first embodiment of the invention, lateral movement of the inverted modular member 1' is effectively prevented. A horizontally disposed tubular member T2', shown in broken line, is telescoped over the inverted modular member 1' in the same manner as that shown in FIGS. 19 and 20. The modular members 1' may, of course, be bolted or otherwise suitably secured together or to the tubular members.

Figure 22:
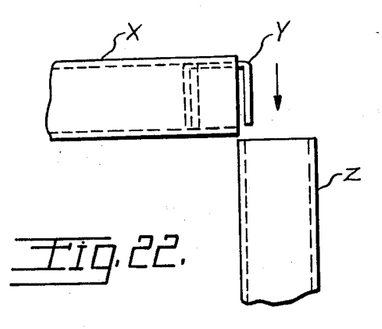
FIGS. 22 and 23 show methods of assembling corner structures of the type shown in FIGS. 19–21.
Figure 23:
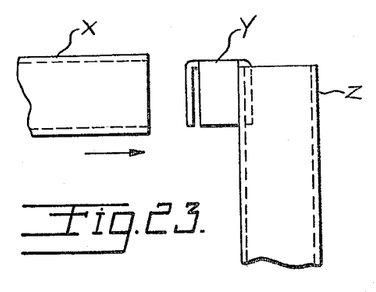

FIGS. 22 and 23, show, in simplified form, advantages derived from the type of corner construction illustrated in FIGS. 19-21. Often in the assembly of vertical and horizontal members, the working space is restricted whereby it is difficult to move or manipulate either the vertical or the horizontal tubular structural member. In the corner construction of FIGS. 19-21, if the space is laterally restricting whereby the horizontally disposed member X cannot be moved endwise any substantial amount, the builder can take advantage of any slight overhead clearance by inserting the inverted modular member Y into the end of the horizontally disposed tubular member and then bringing it downwardly whereby a side wall of the modular member overlaps a wall of the vertically upright tubular member Z. Under these circumstances, the horizontally disposed tubular member X need not be moved endwise and the vertically upright tubular member Z need not be moved laterally.

FIG. 23 shows an advantage in constructing the corner structure where there is limited overhead space but room for either endwise movement of the horizontally disposed tubular member X or lateral movement of the vertically upright tubular member Z. In this situation, the modular member Y which is to receive the horizontally disposed tubular member X is first overlappingly engaged with a wall of a vertical upright tubular member Z whereby either the horizontally disposed tubular member can be moved endwise or the vertically upright tubular member can be moved laterally to cause said horizontally disposed tubular member to telescope over the modular member. Thus, there is no necessity for moving the horizontally disposed member in a vertical direction at all.

Figure 24:
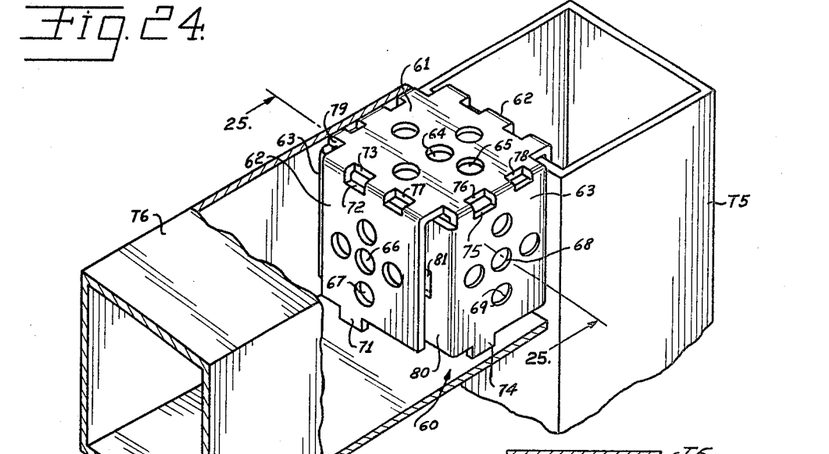
FIG. 24 is a perspective view, partially cut away, showing a fifth form of the modular device in assembled relationship with a pair of tubular members.

The fifth form of the invention is well shown in FIG. 24 and like the previous forms comprises a modular, cubiform member, generally indicated at 60. The member 60, here shown in the inverted position, has a bottom wall 61 and four separated, integrally formed side walls 62, 62 and 63, 63. The side walls 62 are disposed opposite to each other and are substantially similar to the side walls in all of the previous embodiments of FIGS. 1-15 and 19-23. The side walls 63 are substantially modified as herein later fully described.

The bottom wall 61, as in the previous forms of the invention, has a central aperture 64 and four radially outwardly positioned apertures 65. The side walls 62 and 63 are similarly provided with central apertures 66 and 68 respectively which are surrounded by radially disposed apertures 67 and 69 respectively. Each side wall 62 has a tongue 71 at the distal edge thereof and a corresponding slot 72 which intersects another slot 73 of the bottom wall 61. In the same manner, each side wall 63 has a tongue 74 at its distal edge and a corresponding slot 75 which intersects a slot 76 of said bottom wall. Additional slots 77 and 78 are provided in the bottom wall 61 in the same manner and location and for the same purpose as the slots 7 of the first form of the invention. The corners of the modular member 60 are also notched at 79 in the same manner as shown at 8 in FIG. 1.

Each lateral side edge of each side wall 63 is provided with an integrally formed, right angularly inwardly bent wall extension 80 which projects inwardly behind and is disposed parallel with the adjacent side wall 62. Each wall extension has a slot 81 disposed in horizontal alignment with the central apertures 66 of the side walls and the radially disposed apertures 67 disposed horizontally on either side of said central aperture. As well shown in FIG. 25, the distal edge of each wall extension 80 is provided with a pair of cam surfaces 82 and 83 which converge upwardly and downwardly with respect to corresponding cam surfaces of the wall extension which is coplanar therewith. The result is that the distal edges of a pair of coplanar wall extensions 80 afford a generally diamond shape opening between said distal edges with the cam surfaces converging upwardly and downwardly from the slots 81.

Figure 25:
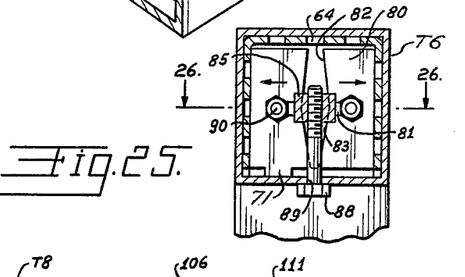
FIG. 25 is a section taken along the line 25—25 of FIG. 24.

A symmetrical cam follower expander 85 extends across the modulator member 60 centrally between the upper and lower edges of the wall extensions 80. A cam follower 85 is shown in FIG. 25, which said cam follower has a vertical dimension greater than the slots 81 and extends above and below said slots. The ends of said cam follower have inwardly stepped or reduced portions 86 which are disposed between the cam surfaces. Once the cam follower 85 is snapped into place, it is held against free upward and downward movement by the fact that the cam surfaces 82 and 83 taper upwardly and downwardly, and it is held against lateral or endwise movement by the stepped or reduced portions 86 which are held captive by the wall extensions 80.

The cam follower 85 is centrally vertically tapped at 87 to receive a bolt 88. In the assembly of FIG. 24, the bolt 88 projects upwardly into the inverted member 60, but it will be readily understood that said bolt might also project downwardly through the bottom wall 61 by means of the central aperture 64 thereof.

As shown in FIG. 24, one of the side walls 62 is positioned downwardly in overlapping relation to a wall of an upright tubular structural member T5. For this type of construction, each side wall 62 is spaced outwardly from the adjacent wall extensions 80 a distance equal to the metal thickness of the tubular member thus causing the outer surfaces of the adjacent wall extensions to bear flatwise against the tubular member T5. A horizontally disposed tubular member T6 is telescoped over the modular member 60 with the end of said tubular member T6 abutting the side of the tubular member T5.

As illustrated in the sectional view of FIG. 25, the bolt 88 projects upwardly through a suitable aperture 89 in the bottom wall of the tubular member T6 and into the tapped cam follower at 87. It will be readily understood that tightening of the bolt 88 causes the cam follower expander 85 to move downwardly between the cam surfaces 83 thereby camming the wall extensions 80 apart and into pressure contact with the side walls of the tubular member T6. Thus the tubular member T6 is held rigidly in position by the outward expansion of the side walls 63 against the inside of the tubular member T6. If the bolt 88 were projected downwardly through the central aperture 64 in the bottom wall 61 and then tightened, the cam follower 85 would then be wedged upwardly between the cam surfaces 82 and the same outward compressive movement of the side wall 63 would be effected.

Figure 26:
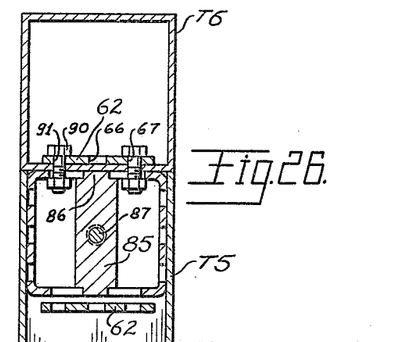
FIG. 26 is a section taken along the line 26—26 of FIG. 25.

In the construction shown in the perspective view of FIG. 24, the overlapping side wall 62 is secured to the tubular member T5 by a pair of bolt and nut assemblies 90 as best seen in FIGS. 25 and 26. The bolt and nut assemblies 90 project through apertures 67 disposed on either side of the central aperture 66, suitable aligned apertures 91 provided in the wall of the tubular member T5, and the aligned slots 81 in the adjacent wall extension 80. Thus the two tubular members T5 and T6 are rigidly secured together in a corner structure. It will be noted that the spacings between the horizontally aligned apertures 67 and the lateral extent of the slot 81 allow the bolt and nut assembly 90 to be positioned and pass on either side of the cam follower 85 whereby there is no interference therewith.

Figure 27:
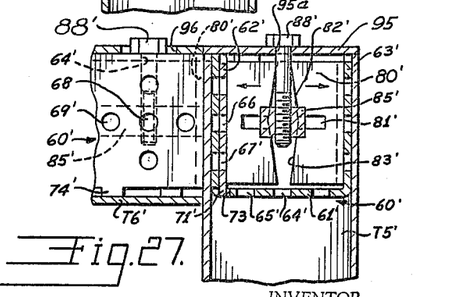
FIG. 27 is a section of a corner structure wherein two modular devices of the type shown in FIG. 24 are utilized.

FIG. 27 shows a corner structure using two modular members of the type shown in FIG. 24 in the manner illustrated in FIGS. 20 and 21. The modular members of FIG. 27, designated generally at 60', are substantially similar to the members 60 but are modified whereby their side walls 62' are spaced outwardly from their wall extension 80' a distance equal to substantially the metal thickness of the modular members and the metal thickness of the tubular members to which they are connected. Each modular member 60' has a bottom wall 61', the overlapping type side walls 62', and the modified side walls 63'. The bottom wall 61' has a central aperture 64' and radially disposed apertures 65'; the walls 62' have central apertures 66' and radially positioned apertures 67'; and, the side walls 63' have central apertures 68' and radially positioned apertures 69'. The side walls 62' have tongues 71' adapted to interfit slots 73' of a relatively inverted, like modular member. The side walls 63' have tongues 74', and it will be understood that the modular members 60' are otherwise provided with slots corresponding to those shown at 72 and 75–78 in FIG. 24, all of which are not shown in FIG. 27 and are not necessary to the understanding of the corner structure presently being described.

The wall extensions 80' have slots 81', corresponding to the slots 81, as well as upwardly and downwardly relatively tapered cam surfaces 82' and 83'. A cam follower expander 85' is carried wedgingly between the tapered edges of the wall extensions 80' and is adapted to receive a tightening bolt 88'.

In the construction of FIG. 27, a first modular member in the upright position is inserted in the upper open end of a tubular member T5', and a second modular member in the inverted position has one of its side walls 62' overlapping one of the side walls 63' of the first modular member and an upper end portion of a wall of a tubular member T5'. A horizontally disposed tubular member T6' is telescoped over the inverted modular member 60' in the manner described previously. A rectangular cap 95 is also seated upon the upper edges of the tubular member T5 to close the same and to provide a bearing surface for the associated bolt 88'.

A bolt 88' projects downwardly through a suitable aperture 95a in the cap 95 and engages the cam follower 85' of the upright modular member 60' whereby tightening of said bolt causes the above described outward expansion of the opposed side walls 63' to tightly secure said modular member within the upper end portion of the tubular member T5'. The tubular member T6' is provided at its upper surface with an access hole 96 whereby a bolt 88' can project downwardly through the central aperture 64' in the bottom wall of the inverted modular member 60' to engage the cam follower 85' associated with said inverted modular member. In this instance, the bottom wall 61' of the modular member itself serves as a bearing surface against which the associated bolt 88' can be tightened to cause lateral expansion of the side walls 63' and thus tightening of the modular member within the tubular member T6'. Thus, both tubular members are held firmly in place.

Figure 28:
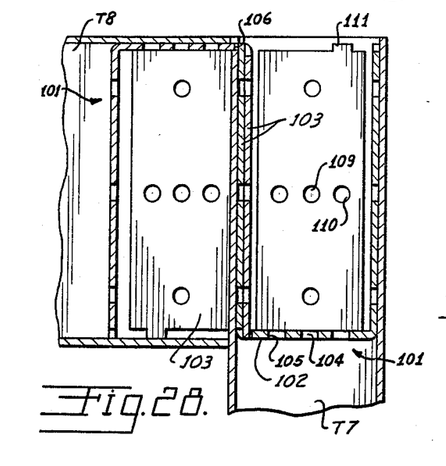
FIG. 28 is a section similar to FIG. 21 showing the first form of the invention modified by elongating the side walls thereof.

FIG. 28 illustrates a corner structure made with two modular members of the type shown in the first embodiment of the invention wherein the modular members indicated at 101 have side walls which are elongated to substantially twice their normal length. In other words, whereas a modular member 1 according to the first form of this invention is cubiform, a modular member 101 is square in transverse section and is rectangular in longitudinal section with the length being, in the form shown, substantially twice the width. This illustrates a use of the invention wherein a vertically upright tubular member T7 is square in cross section and is connected to a horizontally disposed tubular member T8 which is rectangular in cross section having one dimension thereof being substantially greater than the other. If, for example, the tubular member T7 represents a tubular structural member which is four inches square in transverse section, the tubular member T8 then represents a tubular structural member which is four inches by eight inches in transverse section. The corner structure shown incorporates the use of two modular members as shown in FIGS. 20, 21, and 27, but it will be readily understood that the modular member 101 may be made to function singularly in the manner illustrated in FIGS. 19, 22, and 23.

Briefly, each modular member 101 has a bottom wall 102, side walls 103, apertures 104 and 105 in said bottom wall, tongue receiving slots 106, apertures 109 and 110 in said side walls, and tongues 111 at the distal edges of said side walls. A first modular member 101 is inserted in the upright position in the upper open end portion of the tubular member T7 with a second modular member, disposed in the inverted position, having one of the side walls 103 thereof overlappingly engaging an upwardly directed side wall 103 of the upright member and an upper wall portion of the tubular member T7. It will be readily understood that with this arrangement, the upright modular member is positioned to receive the square, four-by-four inch upright tubular member T7 whereas the inverted modular member is adapted to receive the four-by-eight inch, horizontally disposed tubular member T8. It will be understood that the dimensions herein referred to are representative only and not intended as a limitation on the present invention. It will also be readily understood that either or both of the modular members 101 may be bolted to the tubular members T7 and T8 by making use of appropriately aligned apertures 104, 105, 109, or 110 and that the interengagement between the tongues 111 and the slots 106 prevent any lateral displacement of the tubular member T8 with respect to the upright tubular member T7.

In each of the corner constructions of FIGS. 19–28, an extremely solid, right angularly disposed mounting member is provided by the outwardly extending modular member due to the fact that the vertical edges of side walls which are adjacent to the overlapping side wall bear firmly and solidly against the side of the upright tubular member. This construction prevents sagging of the horizontally disposed tubular member and insures a strong, right angularly disposed corner structure. The load capacity of the horizontally disposed tubular member will, of course, depend upon the shear strength of the metal from which the modular member is made. When it is desired that the horizontally disposed tubular member have greater supporting strength, a modular member constructed according to that shown at 60 in FIG. 24 and using bolts as shown in FIGS. 25 and 26 is preferred. In this construction, shear strength of a single thickness of the metal is not alone depended upon since the wall extensions 80 as well as the side walls 62 are bolted to the tubular member T5. Therefore, by a proper choice of metal thickness and hardness for manufacture of the modular member itself as well as in the manufacture of the bolt and nut assemblies 90, an extremely strong, load bearing connection may be effected. The wall extensions 80 also have the advantage of substantially increasing the bearing surface of the modular member against the upright tubular member.

It will be further noted that in all of the forms of the invention illustrated in FIGS. 19 through 28, the modular members are made to be assembled into different configurations in the same manner described and illustrated in connection with the first form of the invention.

It will be understood that changes in the details of this invention may be made, such as changes in size and dimensions, without departing from the spirit thereof or the scope of the appended claims.

What is claimed is:

1. A modular device for connecting structural units comprising a cubiform member having a bottom wall, an opposite open side, and four side walls connected to said bottom wall along a lower edge of each said side wall; said side walls separated from each other along portions of their lateral edges in such manner that any one of said walls can be projected into another like modular device in lapping, contiguous relation to any side wall of said other modular device by inverting said first mentioned modular device; each of said side walls having a like tongue projecting from the upper edge thereof positioned in a like manner with the tongue of every other side wall; said bottom wall being apertured in like manner adjacent the connected edge of each said side wall in such manner that a tongue of any wall of a like modular device interfits the aperture associated with the connected portion of the wall of said first mentioned modular device which it overlaps.

2. A modular device as set forth in claim 1 wherein the recited side walls are notched at their connected edges in such manner as to interfittingly receive tongues from the walls of a like modular device when said first mentioned modular device is seated with its open side abutting the bottom wall of a like modular device.

3. A modular device as set forth in claim 2 wherein the recited bottom wall is provided with an opening adjacent the connected edge of each side side wall in such manner that when a plurality of walls, each of a like modular device, are overlapped respectively with a plurality of said walls of the first mentioned modular device, one opening from each of the plurality of modular devices can receive a tongue of yet another modular device which is seated with its open side abutting the open side of said first mentioned modular device.

4. A modular device as set forth in claim 3 wherein the recited side walls are uniformly perforated in such manner that when side walls of different modular devices are in the aforesaid lapped, contiguous relation, the perforations of the overlapping walls are in register with each other.

5. A modular device as set forth in claim 4 wherein the recited bottom wall is provided with concentric aperture means therein.

6. A modular device as set forth in claim 3 wherein the adjacent lateral edges of said side walls are joined throughout not more than one-half of the vertical dimension of said side walls as measured from said bottom wall; each of the joined portions of the lateral edges of said side walls being convexly rounded about an axis parallel with said side walls and disposed within said cubiform member.

7. A modular device as set forth in claim 3 wherein the adjacent lateral edges of said side walls are joined throughout not more than one-half of the vertical dimension of said side walls as measured from said bottom wall; each of the joined portions of the lateral edges of said walls being generally right angularly indented and forming a V-shape groove between adjacent side walls.

8. In a modular device as set forth in claim 4; means for interlocking said modular device with a like modular device when said devices have walls in overlapping engagement with each other; said means comprising a pair of oppositely directed latch portions joined at their inner ends by a resilient tension member; each said latch portion having a shank portion at its outer end which is adapted to interfit said perforations and an enlarged portion at its inner end larger than said perforations; said means disposed within one of the modular devices with one of said shank portions disposed through the aligned perforations of the overlapping walls and the other said shank portion disposed in the opposite wall perforation of that modular device in which it is disposed, said tension means being compressed to hold said latch means in position.

9. A modular device for connecting structural units comprising a bottom wall and a plurality of side walls connected to said bottom wall along a lower edge of each said side wall; at least one of said side walls separated from adjacent side walls along portions of its lateral edges; said one side wall having a tongue projecting from its upper edge; said bottom wall being apertured adjacent the connected edge of said one wall in such manner that a tongue of a like wall of another said modular device interfits said aperture, and a like aperture of the other modular device receives said tongue of said one side wall, when one of said devices is inverted relative to the other and said one wall overlaps the like wall of said other like modular device.

10. A modular device for connecting structural units comprising a member having a bottom wall and a plurality of side walls connected to said bottom wall along a lower edge of each said side wall; said side walls separated from each other along portions of their lateral edges in such manner that any one of said walls can be projected into another like modular device in lapping, contiguous relation to any side wall of said other modular device by inverting said first mentioned modular device; each of said side walls having a like tongue projecting from the upper edge thereof positioned in a like manner with the tongue of every other side wall; said bottom wall being apertured in like manner adjacent the connected edge of each said side wall in such manner that a tongue of any wall of a like modular device interfits the aperture associated with the connected portion of the wall of said first mentioned modular device which is overlaps.

11. A connecting assembly comprising a pair of like, modular devices; each modular device having a bottom wall, an opposite open side, and four side walls connected to said bottom wall along a lower edge of each said side wall; said side walls of each device separated from each other along portions of their lateral edges; the side walls of each device having a like tongue projecting from the upper edge thereof positioned in a like manner with the tongue of every other side wall; the bottom wall of each device being apertured in like manner adjacent the connected edge of each associated side wall; one of said devices being inverted relative to the other and having one of its side walls projected into the other said device whereby a side wall of each modular device contiguously overlaps a side wall of the other modular device with the tongue of each overlapping wall interfitting the aperture of the other device which is adjacent the said wall it overlaps.

12. A connecting assembly as set forth in claim 11 including a third like modular device connected in a like manner to one of said pair of devices; said third device connected to a wall of one of said pair of devices which is composed at right angles to the wall to which the other of said pair of devices is connected.

13. A corner structure comprising an upright tubular structural member; a modular device comprising a hollow, cup-shaped member having four side walls and a bottom wall; all of said walls disposed at right angles to adjacent of said walls; at least one of said side walls having lateral edges separated from adjacent of said side walls with said separated side wall downwardly overlapping one wall of said tubular member on the inside of said tubular member; edge portions of side walls adjacent to said separated side wall abutting edgewise against the outer surface of said tubular member whereby said modular device is maintained at right angles to said upright tubular member and is adapted to receive telescoped thereover a second, horizontally disposed tubular member.

14. A corner structure as set forth in claim 13 wherein said upper edge portion of said tubular structural member has an upwardly open notch therein with which said separated side wall is aligned; means defining notches in adjacent corners of said bottom wall on either side of said separated wall whereby a portion of said bottom wall is captively disposed within said notch and held against lateral movement relative to said upright tubular member.

15. A corner structure comprising an upright tubular structural member defining a square in cross section; a like, horizontally disposed tubular structural member intersecting said upright tubular member adjacent to the upper end thereof; a wall portion of said upright tubular member which is disposed adjacent to the end of said horizontally disposed tubular member having an upwardly open notch therein; a modular device disposed in upright position telescoped within the upper end portion of said upright tubular member; said modular device being cubiform in shape and comprising a flat bottom wall and four upright flat side walls connected at their lower edges to the edges of said bottom wall; at least one of said side walls having its lateral edges separated from adjacent side walls; a like modular device in inverted position having its separated side wall downwardly overlapping the notched wall of said upright tubular member and one side wall of said first mentioned modular device whereby a portion of the bottom wall of said second mentioned modular device is laterally captively disposed within said notch; said horizontally disposed tubular member telescoped over said second mentioned modular device whereby said horizontally disposed tubular member is connected to said vertically upright tubular member.

16. A corner structure comprising a vertically upright tubular member; a horizontally disposed tubular member intersecting said upright tubular member adjacent to the upper end of said upright tubular member; a modular device positioned within the upper end portion of said upright tubular member and comprising a bottom wall and a plurality of side walls projecting upwardly therefrom and connected to said bottom wall along the lower edge of each said side wall; at least one of said side walls separated from adjacent side walls along portions of its lateral edges; said one side wall having a tongue projecting from its upper edge; said bottom wall being apertured adjacent the connected edge of said one wall in such manner that the tongue of a like wall of another said modular device interfits said aperture, and a like aperture of the other modular device receives said tongue of said one side wall, when one of said devices is inverted relative to the other and said one wall overlaps the like wall of said other like modular device; a second like modular device in inverted position having its separated wall downwardly overlapping both said one wall of said first mentioned modular device and a portion of one wall of said upright tubular member whereby said modular devices interengage each other and are attached to said upright tubular member; said horizontally disposed tubular member being telescoped over said second mentioned modular device.

17. Corner structure means comprising a vertically upright, square tubular structural member; a horizontally disposed square tubular structural member; a modular device of cubiform shape comprising a flat bottom wall and four flat side walls; at least one of said side walls being separated along its lateral edges from adjacent side walls whereby it can be overlapped downwardly over one upper edge portion of said upright tubular member; said modular device being of such size as to closely; slidably interfit the open end of said horizontally disposed tubular member whereby said modular member may either be first connected to said upright tubular member by overlapping said separated wall with one wall of said upright tubular member and subsequent horizontal endwise movement of said horizontal tubular member into telescoping relation with said modular device or by first telescoping said modular device within the opened end portion of said horizontally disposed tubular member after which said separated wall portion engages a wall portion of said upright tubular member by a vertical, downward movement of said horizontal tubular member.

18. A modular device for connecting structural units comprising a cubiform member having a bottom wall, an opposite open side, and four side walls connected to said bottom wall along a lower edge of each said side wall; said side walls separated from each other along portions of their lateral edges; one oppositely disposed pair of said side walls having inwardly turned wall extensions at the lateral edges thereof directed toward wall extensions of the opposite of said one pair behind and parallel with the other pair of said side walls; the separation of said side walls along their lateral edges being such that either one of said other pair of side walls can be projected into another like modular device in lapping, continuous relation to any side wall of said other modular device by inverting said first mentioned modular device.

19. A modular device as set forth in claim 18; each of said side walls having a like tongue projecting from the distal edge thereof positioned in a like manner with the tongue of every other side wall; said bottom wall being apertured in like manner adjacent the connected edge of each said side wall in such manner that a tongue of either wall of said other pair of said like modular device interfits the aperture associated with the connected portion of the wall of said first mentioned modular device which is overlapped.

20. A modular device as set forth in claim 18; adjacent distal edges of said wall extensions affording cam surfaces converging in a direction parallel with said one pair of side walls; a cam follower expander member having portions thereof disposed between pairs of said cam surfaces; and means for pulling said cam follower in the direction of convergence of said cam surfaces whereby said one pair of said side walls is pressed outwardly.

21. A corner structure comprising an upright tubular member which is square in cross section; a like, horizontally disposed tubular member intersecting said upright tubular member adjacent to the upper end thereof; a cubiform modular device having a bottom wall and two oppositely disposed pairs of upright side walls; said side walls separated along their lateral edges from adjacent side walls; one opposite pair of said side walls having wall extensions turned inwardly and disposed parallel with the other pair of said side walls; said wall extensions having horizontally disposed slots therein opening at their distal edges; opposed pairs of said wall extensions having cooperating, upwardly and downwardly converging cam surface edges above and below said slots; said modular member being inverted with one of said other pairs of said walls downwardly overlapping inside an upper edge portion of said upright tubular member with the adjacent wall extensions disposed flatwise against the outer surface of said upright tubular member; bolt and nut assemblies projecting through said one side wall, the wall of said upright tubular member, and the slots of the adjacent of said wall extensions whereby said modular member is secured to said upright tubular member and projects outwardly therefrom at right angles; said horizontally disposed tubular member telescoped over said modular member; a cam follower expander disposed between said cooperating cam surfaces and projecting across said modular member at right angles to said wall extensions; and a bolt projecting through one wall of said horizontally disposed tubular member at right angles to said expander and thread fitted to said expander whereby when said bolt is tightened, said expander is pulled between said converging cam surfaces and causes said one pair of said side walls to expand outwardly to tightly interfit said horizontally disposed tubular member.

22. A corner structure comprising a pair of modular members; each said modular member being cubiform and having a bottom wall and four relatively right angularly disposed, upright side walls; said side walls separated from each other along the lateral edges thereof; a first oppositely disposed pair of said side walls having inwardly directed wall extensions positioned between and parallel with a second oppositely disposed pair of side walls; said wall extensions disposed in mutually directed, coplanar pairs having spaced distal edges convergently angled in opposite directions to provide oppositely converging cam surfaces; a cam follower expander disposed within said modular member having end portions thereof disposed between said pairs of spaced edges; a bolt thread fitted to said expander for pulling said expander in one direction of said converging cam surfaces to expand said first pair of side walls outwardly; an inverted, like modular member having one of its second pair of side walls projected into said first mentioned modular member in lapping, contiguous relation to one wall of its first pair of side walls; a vertically upright, tubular structural member telescoped upwardly over said first mentioned modular member and having one wall thereof disposed between said first mentioned modular member and one coplanar pair of wall extensions of said like modular member; a horizontal tubular member telescoped over said like modular member at right angles to said upright tubular member; a cap covering the upper end of said upright tubular member and the upper side of said first mentioned modular member; said bolt of said first mentioned modular member projecting downwardly through said cap and the bolt of said like modular member projecting downwardly through said bottom wall of said inverted like modular member whereby the tightening of said bolts expands both said modular members to tightly engage both said tubular members.

23. A corner structure as set forth in claim 22; each of said side walls of each said modular member having a like tongue projecting from the upper edge thereof positioned in a like manner with the tongue of every other side wall; said bottom wall of each said modular member being apertured in like manner adjacent the connected edge of each said side wall in such manner that a tongue of each overlapping wall of said modular members interfits an aperture associated with the connected portion of the wall of the other modular member which it overlaps.

24. A modular device for structural units comprising a hollow, cup shaped member having a square, flat bottom wall and four upwardly projecting, rectangular side walls having a vertical length greater than the width of said bottom wall; all of said walls disposed at right angles to adjacent of said walls; at least one of said side walls having edge portions at both lateral sides separated from adjacent side walls in such manner that the separated wall can be projected into another modular device of the same type in lapping, contiguous relation to a side wall of said other device.

25. A modular device as set forth in claim 24; all of said side walls having edge portions at both lateral sides separated from adjacent side walls in such manner that any separated wall can be projected into another modular device of the same type in lapping, contiguous relation to any side wall of said other device; each of said side walls having a like tongue projecting from the upper edge thereof positioned in a like manner with the tongue of every other side wall; said bottom wall being apertured in like manner adjacent the connected edge of each said side wall in such manner that a tongue of any wall of a like modular device interfits the aperture associated with the connected portion of the wall of said first mentioned modular device which it overlaps.

26. A corner structure comprising an upright tubular member of square cross section; a horizontal tubular member of rectangular cross section having a horizontal dimension equal to the width of said upright member and a vertical dimension in excess thereof; a modular member having a square bottom wall adapted to interfit said upright tubular member and four upright rectangular side walls having a vertical dimension greater than the width of said bottom wall and adapted to interfit said horizontal tubular member; said side walls being separated from adjacent side walls along their lateral edges; a like tongue positioned in a like manner projecting from the upper edge of each said side wall; said bottom wall being apertured in like manner adjacent to the connected edge of each said side wall; an inverted, like modular member having one wall thereof projected into said first mentioned modular member in lapping, contiguous relation to a side wall of said first mentioned modular member with the tongue of each overlapping wall interfitting the aperture associated with the other overlapped wall; said upright tubular member telescoped upwardly over said first mentioned modular member and said horizontal tubular member telescoped laterally over said like modular member.

References Cited by the Examiner
UNITED STATES PATENTS

| | | |
|---|---|---|
| 2,299,256 | 10/1942 | Schultz. |
| 2,427,841 | 9/1947 | Dichter _________ 248—188.5 X |
| 2,487,654 | 11/1949 | Hoffman et al. _________ 46—26 |
| 2,733,786 | 2/1956 | Drake _____________ 189—36 X |
| 2,961,077 | 11/1960 | Chris _______________ 189—36 |

RICHARD W. COOKE, JR., *Primary Examiner.*

FRANK L. ABBOTT, L. R. RADANOVIC,
*Assistant Examiners.*